UNITED STATES PATENT OFFICE.

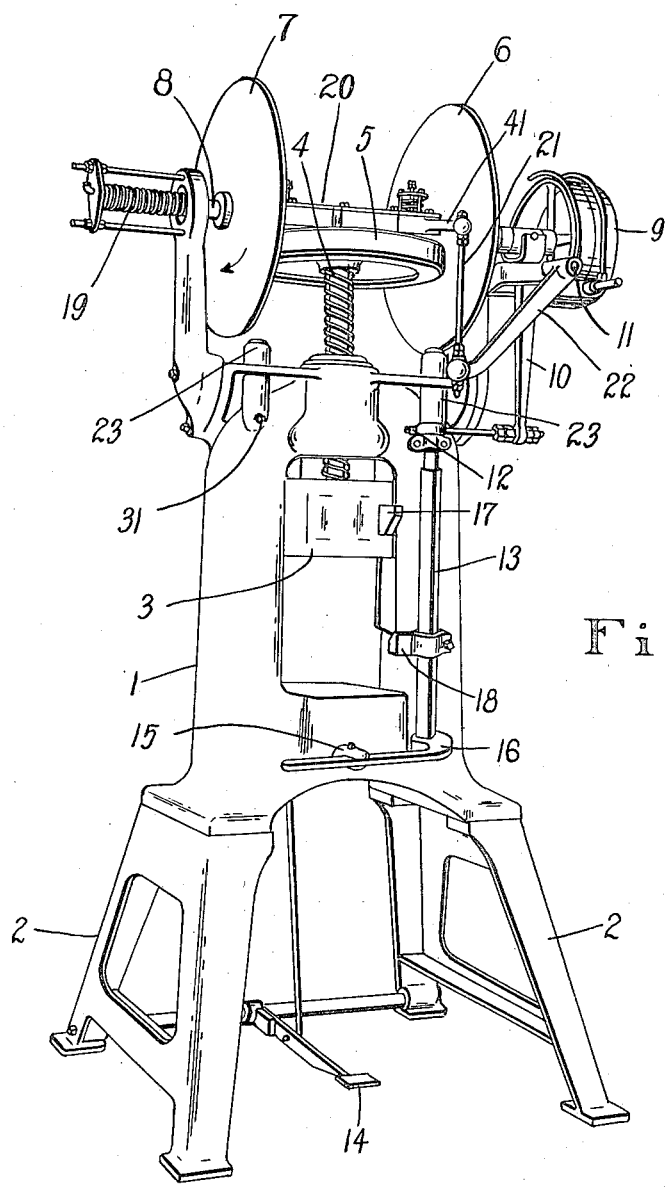

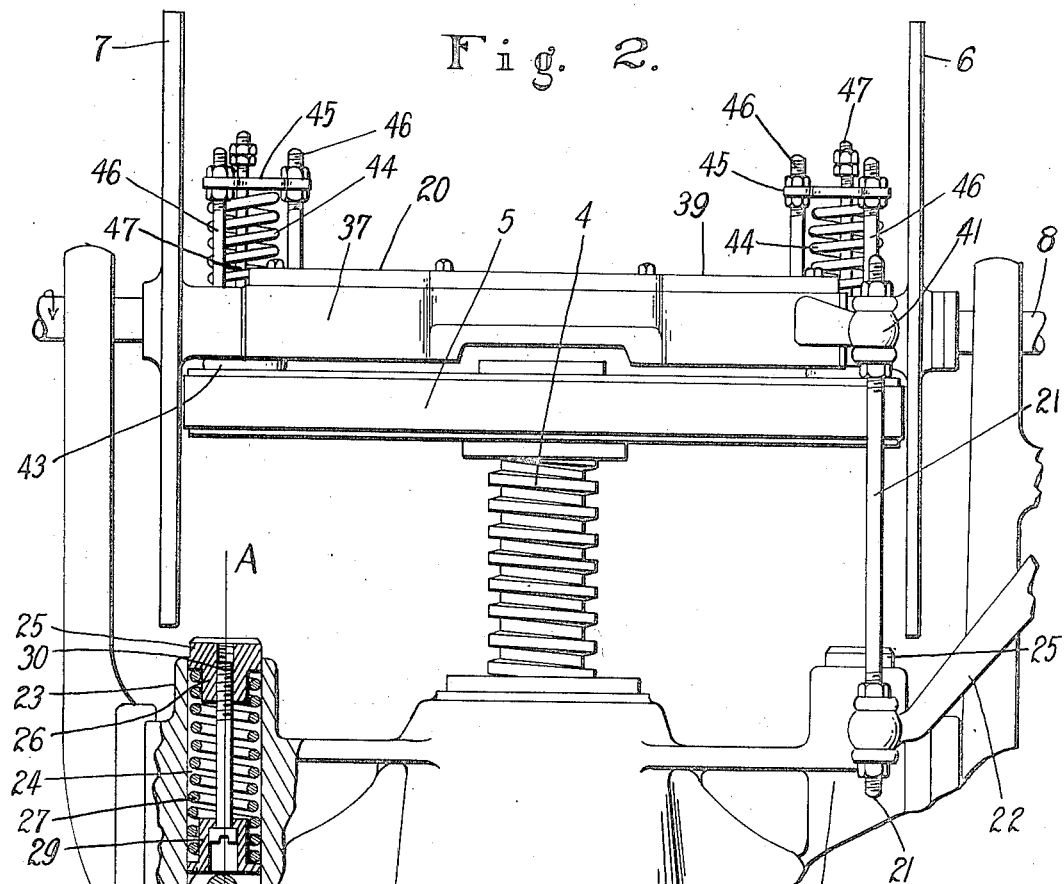

EDMUND WILHELM ZEH, OF NEWARK, NEW JERSEY.

POWER-PRESS BRAKE MECHANISM.

1,324,095.              Specification of Letters Patent.          Patented Dec. 9, 1919.

Application filed September 20, 1916. Serial No. 121,109.

*To all whom it may concern:*

Be it known that I, EDMUND W. ZEH, a citizen of the United States of America, and a resident of Newark, county of Essex, in the State of New Jersey, have invented certain new and useful Improvements in Power-Press Brake Mechanism, of which the following is a specification.

This invention relates to that class of power presses in which a head for carrying the upper die is moved up and down by a screw rotated by a friction wheel on its upper end adapted to be turned by opposite drive disks upon a shaft which can be slid longitudinally to bring either the lowering drive disk or the elevating drive disk into engagement with the friction wheel or to position said drive disks neutrally, that is, both out of engagement with the friction wheel. More particularly the invention relates to stopping upward movement of the hammer by brake means which engage the friction wheel and overcome the momentum of friction wheel, screw and hammer, as well as shift the driving disks.

The objects of the invention are to provide a resilient upper brake adapted to presses of this type; to enable the tension or resistance of such a brake to be adjusted; to utilize such a brake to overcome most of the momentum of the friction wheel, screw and hammer before the drive disks are shifted; to thus avoid excessive wear from the contacting surfaces of the lowering disk and the friction wheel; to combine such a brake with the means for shifting the drive disks; to secure a simple and efficient construction, and to obtain other advantages and results as may be brought out in the following description.

Referring to the accompanying drawings, in which like numerals of reference indicate the same parts throughout the several views, Figure 1 is a perspective view of a press embodying my invention;

Fig. 2 is a front elevation of the upper portion of the same having parts broken away and showing one of the lower emergency brakes in central vertical longitudinal section;

Fig. 3 is a central vertical longitudinal section of said lower emergency brake, taken on line A—A of Fig. 2, or at right angles to the section shown therein;

Fig. 4 is a cross-section of said brake on line B—B of Fig. 2;

Figure 5:
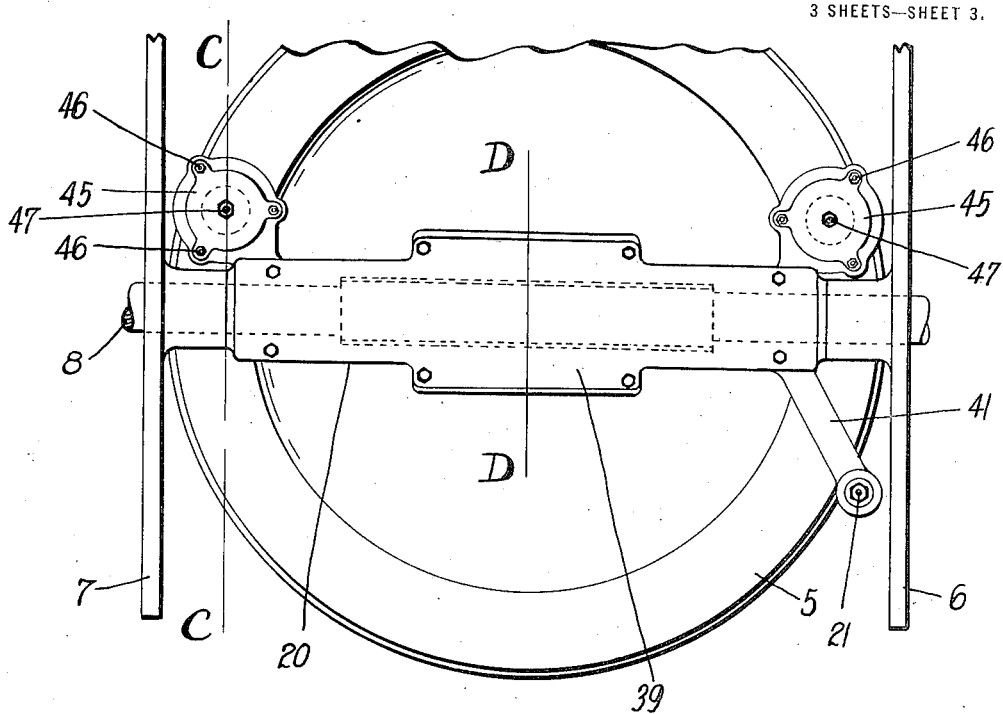
Fig. 5 is a plan of the press.
Figure 7:
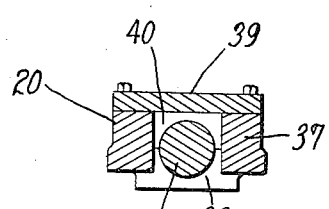
Fig. 7 is a section on line D—D of Fig. 5.
Figure 6:
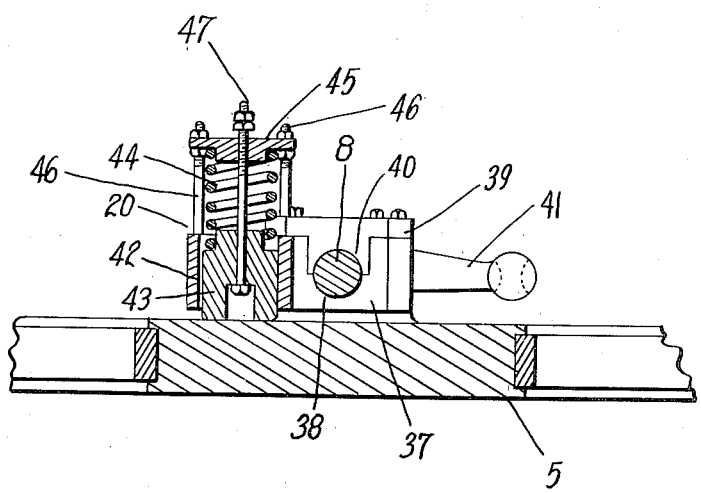
Fig. 6 is a section on line C—C of Fig. 5 showing one of the upper brakes in central vertical longitudinal section.

In the specific embodiment of the invention illustrated in said drawings, the reference numeral 1 indicates the frame of a press, shown mounted upon legs 2, 2 to elevate it to a suitable and convenient height. Said frame 1 is centrally open, providing a vertical slideway for a head or hammer 3 carried upon the lower end of a screw 4 which works through the top of said frame and has fixed upon its upper end above the frame a horizontal wheel 5 providing at its periphery a friction surface. This friction wheel has at diametrically opposite sides of itself vertical driving disks 6, 7 upon a driving shaft 8 which carries belt pulleys 9 and is slidable longitudinally to carry the driving disks into and out of engagement with the friction wheel. Such longitudinal sliding is accomplished in various ways in the art, and in the particular press which I have shown it is effected by a forked lever 10 fast upon a trunnion pin 11 and adapted to be swung by virtue of its connection to an arm 12 upon a vertical control rod 13. Upon pressing down the treadle 14, a detent (not shown) is released so that the spring-controlled plunger 15 draws the lever 16 toward the frame of the machine and turns the control rod 13 sufficiently to engage the lowering drive disk 6 with the friction wheel 5. At a proper point of its descent, a lug 17 upon the hammer 3 engages a dog 18 on the control rod 13 and slides the shaft 8 back again, as well as withdrawing the plunger 15, which is locked again by its detent. The lowering drive disk 6 is now free from the friction wheel 5, and a spring 19 forces the lifting drive disk 7 against the friction wheel, a slot and pin connection between the plunger 15 and its lever 16 providing enough lost motion for this. The friction wheel and parts carried thereby are thus lifted until said wheel engages a braking device 20 fulcrumed above it upon the shaft 8 and by swinging the same transmits motion through a link 21 and an arm 22 to slide the shaft 8 enough to disengage the lifting drive disk 7 from the friction wheel and yet not engage the lowering drive disk 6 with it. The drive disks are thus in neutral position and the press remains idle until the treadle 14 is again depressed.

It is found that presses of this type are sometimes broken by those unskilled in their use by starting the press in operation upon a down stroke when there is no work between the dies and therefore nothing for the upper die to engage, in which case the friction wheel may travel far enough to strike the top of the threaded socket in which the screw works, with the result that the friction wheel, screw or frame of the press is broken, the friction wheel torn off the screw or some other damage inflicted. Although such accidents may rarely occur, they are always liable to happen, and when the press is injured in this way it involves expense and idleness of the press to repair it, which is a total loss.

In order to prevent this, I arrange upon the top of the press frame emergency brakes 23 for preventing excessive downward movement of the hammer, said emergency brakes being located beneath the friction wheel 5 so as to engage the under surface of the same, preferably near its rim. I have shown, and prefer to employ, two such brakes arranged at diametrically opposite sides of the screw, although more could be employed if desired and in any other suitable arrangement. These emergency brakes being duplicates, a description of one will suffice, and the detail construction of it is more clearly shown in Figs. 2, 3 and 4, of the drawings, where 24 indicates a vertically disposed socket formed preferably in an integral portion cast upon the frame, although of course it might be otherwise secured thereto. The brake proper works in said socket and is shown comprising a cylindrical head 25 adapted to project from the socket and having a reduced neck 26 depending therefrom in the socket. Around said neck and engaging the under side of the head is a helical spring 27 extending axially of the socket, and held under an initial pressure so as to resist further compression with greater force. For so holding the spring compressed a follower 28 is provided for its end away from the head, having a reduced portion 29 adapted to enter within the spring, and said follower is connected to the head so as to hold the head and follower together without preventing their approach upon compression of the helical spring. Preferably the connection is such that the tension of the spring can be adjusted by the screw, and for illustration I have shown a bolt or screw 30 extending axially of the spring with its head in a countersunk recess of the follower and its other end tapped into the head. Any other suitably equivalent connection could be employed however.

In operation, as the friction wheel 5 turns in lowering, it frictionally engages upon the brake head 25 and by continued turning compresses the spring 27 until the inertia of the moving parts is overcome and the wheel stops. The necessary pressure in the springs to bring the friction wheel to rest in a short period is such that it is difficult to turn the wheel back for releasing the same from the brakes, and in order to free the friction wheel, I therefore provide means for relieving the pressure of the spring without first turning the wheel. For this purpose, the follower 28 is shown seated upon a transverse support adapted to be moved and in one position retain the follower raised and in another position permit the follower to lower. This support is shown as a substantial pin 31 extending diametrically of the socket with an end protruding outside the same and squared or made angular in cross-section to receive a wrench for turning the pin. The portion of the pin within the socket is longitudinally cut away at one side of itself, as at 32, thus providing an eccentric mounting upon which the follower will seat. Obviously with the cut-away side of the pin turned upward the follower will be at a lower elevation than with the entire side turned upward. In use, the pin is turned with the entire side upward, so the brake proper is in its uppermost position; then after the friction wheel has compressed the spring 27 and stopped, the pin 31 may be turned with its cut-away side upward, thus reducing the pressure of the spring and permitting the friction wheel to be reversed and raised. After the wheel is raised, the pin 31 is turned back again so its entire side is up and the brake proper held again in raised position ready for action.

For holding the pin 31 and preventing it from jarring out of proper position, a spring-actuated detent 33 is arranged at one side thereof, shown herein as a pointed member 34 pressed by a spring 35 toward the pin with its point riding in a circumferential groove 36 therein, see Fig. 4. At proper intervals seats are countersunk in the groove in which the point of the detent member 34 will lodge and thereby hold the pin stationary.

My improved braking device 20 for stopping movement of the friction wheel 5 upward is shown having a brake support 37 extending longitudinally of the shaft 8 and journaled upon it, said support being preferably applied to the shaft from beneath, with half-bearings 38, 38 therefor near its ends, and having a cap 39 bolted to its top with other half-bearings 40, 40 for the shaft 8 opposite the lower half-bearings. An arm 41 projects from one side of this brake support 37 to slide the shaft 8, through the link 21 and arm 22, already mentioned, when the support rocks, and at the opposite side of the support 37, near its ends so as to be over the margin of the friction wheel, are the brakes. I have shown two of these, though obviously more or less could be used, and as they are alike a description of one will suffice for all.

A vertically disposed sleeve-like socket 42, open at both top and bottom is formed as a part of the support 37 and in this socket is slidably arranged a brake 43 which projects at its lower end to be engaged by the friction wheel. The upper end of said brake 43 is reduced to receive a helical spring 44 seated at its upper end against a plate 45 held by rods 46 extending up from the socket, and this spring is always under tension, a screw or bolt 47 extending through both plate 45 and brake 43 to limit expansion of the spring and yet permit it to compress, the brake 43 being countersunk to receive said screw. The tension of the spring can also be adjusted by means of said rods 46, since they are threaded where they pass loosely through the plate 45 and have nuts engaging said plate.

In operation, the initial tension of the spring 44 is such that as the friction wheel 5, moving upward, engages the brake 43 the spring will compress before the braking device swings as a whole to shift the drive disks 6, 7, and yet said tension is sufficient to overcome most of the momentum of the moving parts. The very last of the upward movement, however, swings the whole braking device 20 and shifts the disks, but at that time the engagement of the lowering disk with the friction wheel will not cause the excessive wear which would otherwise occur. The trouble heretofore has been that such engagement took place while the upwardly moving parts had a great deal of energy and obviously the oppositely rotating friction wheel and drive disk would grind upon each other considerably before the friction wheel was stopped and reversed. By my invention, however, the momentum of the moving parts is largely absorbed by the resilient brakes before the lowering disk is shifted into contact with the friction wheel.

Furthermore, upon starting the press again, (remembering that it finally comes to rest with the drive disks in neutral position), shifting the lowering disk into engagement with the friction wheel swings the braking device 20 to reduce its pressure upon the friction wheel and so facilitate starting.

Obviously detail modifications and changes may be made in the manufacture of my improvements without departing from the spirit and scope of the invention and I do not wish to be understood as restricting myself except as required by the following claims.

Having thus described the invention, what I claim is:

1. In a press of the character described, the combination with a friction wheel adapted to move vertically while rotating, driving disks therefor, and a brake for retarding upward movement of the friction wheel, of means for engaging said brake with the friction wheel and disengaging the driving disks from said friction wheel in sequence, whereby momentum of the friction wheel and parts moving with it is overcome in sequence with the shifting.

2. In a press of the character described, the combination with a friction wheel adapted to move vertically while rotating, driving disks therefor, and a brake for retarding upward movement of the friction wheel, of means for first engaging the brake with the friction wheel to reduce the momentum of the friction wheel and parts moving with it and then disengaging the driving disks from the friction wheel.

3. In a press of the character described, the combination with a friction wheel adapted to move vertically while rotating, driving disks therefor, and a brake for retarding upward movement of the friction wheel, of means for automatically engaging the brake with the friction wheel and subsequently disengaging the driving disks from the friction wheel.

4. In a press of the character described, the combination with a friction wheel and driving disks therefor, of a yielding brake located in the path of movement of the friction wheel, and means operated by said brake for disengaging the driving disks from the friction wheel after the momentum of said friction wheel and parts moving with it has been reduced by the brake.

5. In a press of the character described, the combination with a friction wheel and driving disks therefor, of a yielding brake located in the path of movement of the friction wheel, a yielding support for said brake, and disk shifting means connected to said support.

6. In a press of the character described, the combination with a friction wheel and driving disks therefor, of a yielding brake located in the path of movement of the friction wheel and adapted to be moved by upward movement thereof, and shifting means for the driving disks connected to said moving brake so as to be operated thereby during only a portion of its movement.

7. In a press of the character described, the combination with a friction wheel and driving disks therefor, of a yielding brake located above the friction wheel in the path of movement of the same and adapted to be moved by upward movement thereof, and shifting means for the driving disks connected to said moving brake so as to be operated thereby during only the upper portion of its movement.

8. In a press, the combination with a frame, a screw mounted in said frame, a friction wheel fast on said screw and moving therewith, and driving disks adapted to engage the edge of said friction wheel, of a brake support adapted to be moved by upward movement of the friction wheel, means connected to said brake support to shift said driving disks upon movement of the brake support, and a brake mounted upon said brake support in the path of movement of the friction wheel arranged and adapted to yield with respect to the brake support before said brake support moves to shift the driving disks.

9. In a press, the combination with a frame, a screw mounted in said frame, a friction wheel fast on said screw and moving therewith, and driving disks adapted to engage the edge of said friction wheel, of a yielding brake support located in the path of movement of the friction wheel and adapted to be engaged by the same upon upward movement of the wheel, means connected to said brake support to shift said driving disks upon movement of the brake support, and a brake mounted upon said brake support in the path of movement of the friction wheel arranged and adapted to yield with respect to the brake support before said brake support moves to shift the driving disks.

10. In a press, the combination with a frame, a screw mounted in said frame, a friction wheel fast on said screw and moving therewith, and driving disks adapted to engage the edge of said friction wheel, of a swinging brake support projecting into the path of movement of the friction wheel, means connected to said brake support to shift said driving disks upon movement of the brake support, and a brake mounted upon said brake support in the path of movement of the friction wheel arranged and adapted to yield with respect to the brake support before said brake support moves to shift the driving disks.

11. In a press, the combination with a frame, a screw mounted in said frame, a friction wheel fast on said screw and moving therewith, a drive shaft transverse to said friction wheel, and driving disks on said drive shafts adapted to engage the edge of said friction wheel, of a brake support pivoted on said shaft and extending longitudinally thereof for substantially the diameter of the friction wheel, a brake near each end of said support on one side of the shaft and adapted to engage a marginal portion of the friction wheel, an arm projecting from said support on the opposite side of the shaft, and means connected to said arm for shifting the drive disks upon movement of the brake support.

12. In a press, the combination with a frame, a screw mounted in said frame, a friction wheel fast on said screw and moving therewith, a drive shaft transverse to said friction wheel, and driving disks on said drive shafts adapted to engage the edge of said friction wheel, of a brake support pivoted on said shaft and extending longitudinally thereof for substantially the diameter of the friction wheel, said support comprising a lower part with half bearings adapted to engage the shaft at its side next the friction wheel and an upper part or cap having opposite half bearings, means for securing said parts of the brake support together, a brake near each part of the lower end of said support on one side of the shaft and adapted to engage a marginal portion of the friction wheel, an arm projecting from said lower part of said support on the opposite side of the shaft, and means connected to said arm for shifting the drive disks upon movement of the brake support.

13. In a press of the character described, a swinging brake support providing a transverse socket in alinement with the direction of swinging of the support, a brake in said socket projecting therefrom to engage the part to be braked, means resiliently projecting said brake from the socket, means for preventing escape of said brake, and means connected to said swinging support for stopping the press, said brake having a movement independent of the brake support to reduce the momentum of the part to be braked and then moving with the brake support to stop the press.

14. In a press of the character described, a swinging brake support providing a transverse socket in alinement with the direction of swinging of the support, a brake in said socket projecting therefrom to engage the part to be braked, adjustable resilient means for projecting said brake from the socket, means for preventing escape of said brake, and means connected to said swinging support for stopping the press, said brake having a movement independent of the brake support to reduce the momentum of the part to be braked and then moving with the brake support to stop the press.

15. In a press of the character described, a swinging brake support providing a transverse socket in alinement with the direction of swinging of the support, a brake in said socket projecting therefrom to engage the part to be braked, a spring back of said brake, means for adjusting the tension of said spring, means for limiting the projecting of said brake from said socket, and means connected to said swinging support for stopping the press, said brake having a movement independent of the brake support to reduce the momentum of the part to be braked and then moving with the brake support to stop the press.

16. In a press of the character described, the combination with a friction wheel and driving disks therefor, of a yielding brake located in the path of movement of the friction wheel, and means connected to said brake for disengaging the driving disks from the friction wheel at a different time from engagement of the friction wheel and brake.

17. In a press of the character described, the combination with a friction wheel and driving disks therefor, of a yielding brake located in the path of movement of the friction wheel, and means connected to said brake for disengaging the driving disks from the friction wheel after the brake has reduced the momentum of the friction wheel and parts moving with it.

In testimony whereof I have signed this specification in the presence of two subscribing witnesses.

EDMUND WILHELM ZEH.

Witnesses:
HOWARD P. KING,
JANET A. AYERS.